United States Patent [19]

Masson

[11] Patent Number: 4,553,519
[45] Date of Patent: Nov. 19, 1985

[54] PROPANE FEEDING DEVICE FOR INTERNAL COMBUSTION ENGINES

[76] Inventor: Laverne F. Masson, 246 Harcourt Dr., Saginaw, Mich. 48603

[21] Appl. No.: 650,405

[22] Filed: Sep. 13, 1984

Related U.S. Application Data

[63] Continuation-in-part of Ser. No. 424,922, Sep. 27, 1982, abandoned.

[51] Int. Cl.⁴ ............................................. F02B 43/00
[52] U.S. Cl. ................................. 123/527; 123/568; 123/577; 48/189
[58] Field of Search ................. 125/525–527, 125/568, 572, 577; 46/189.1, 189.2

[56] References Cited

U.S. PATENT DOCUMENTS

| | | | |
|---|---|---|---|
| 532,099 | 1/1895 | Robison | 48/189.1 |
| 954,507 | 4/1910 | Fogler | 123/527 |
| 1,397,780 | 11/1921 | Pohl | 48/189.1 |
| 2,381,304 | 8/1945 | Merrill | 123/527 |
| 2,675,793 | 4/1954 | Ziege | 123/525 |
| 2,889,904 | 6/1959 | Martinoli | 48/189.2 |
| 3,184,295 | 5/1965 | Baverstock | 123/525 |
| 3,664,818 | 5/1972 | Kramer | 48/180 |
| 3,741,737 | 6/1973 | Jones | 48/180 |
| 3,872,845 | 3/1975 | Schultz | 123/568 |
| 3,931,798 | 1/1976 | Hoogeboom | 123/120 |
| 4,068,639 | 1/1978 | Cook | 123/525 |
| 4,279,236 | 7/1981 | Dallman | 123/572 |
| 4,308,843 | 1/1982 | Garretson | 123/525 |
| 4,342,287 | 8/1982 | Concepcion | 123/572 |
| 4,369,751 | 1/1983 | Batchelor et al. | 123/525 |
| 4,370,969 | 2/1983 | Zarrelli et al. | 123/525 |
| 4,372,277 | 2/1983 | Otobe et al. | 123/568 |

*Primary Examiner*—E. Rollins Cross
*Attorney, Agent, or Firm*—Price, Heneveld, Huizenga & Cooper

[57] ABSTRACT

A system for simultaneously injecting propane and gasoline into an internal combustion engine. A propane supply reservoir is connected to the engine carburetor by a first line. A metering valve is positioned in the first line and has a vacuum responsive valve actuator associated therewith. The vacuum responsive actuator is connected by a second line to the EGR valve which creates a stronger vacuum with increasing engine speed. As the vacuum strength increases, the valve actuator opens the valve further allowing more propane to flow into the carburetor which is also drawing vaporized gasoline through conventional means. Preferably, an air aspirating device is positioned in the first line between the valve and carburetor for mixing air with the propane.

28 Claims, 15 Drawing Figures

Fig. 1

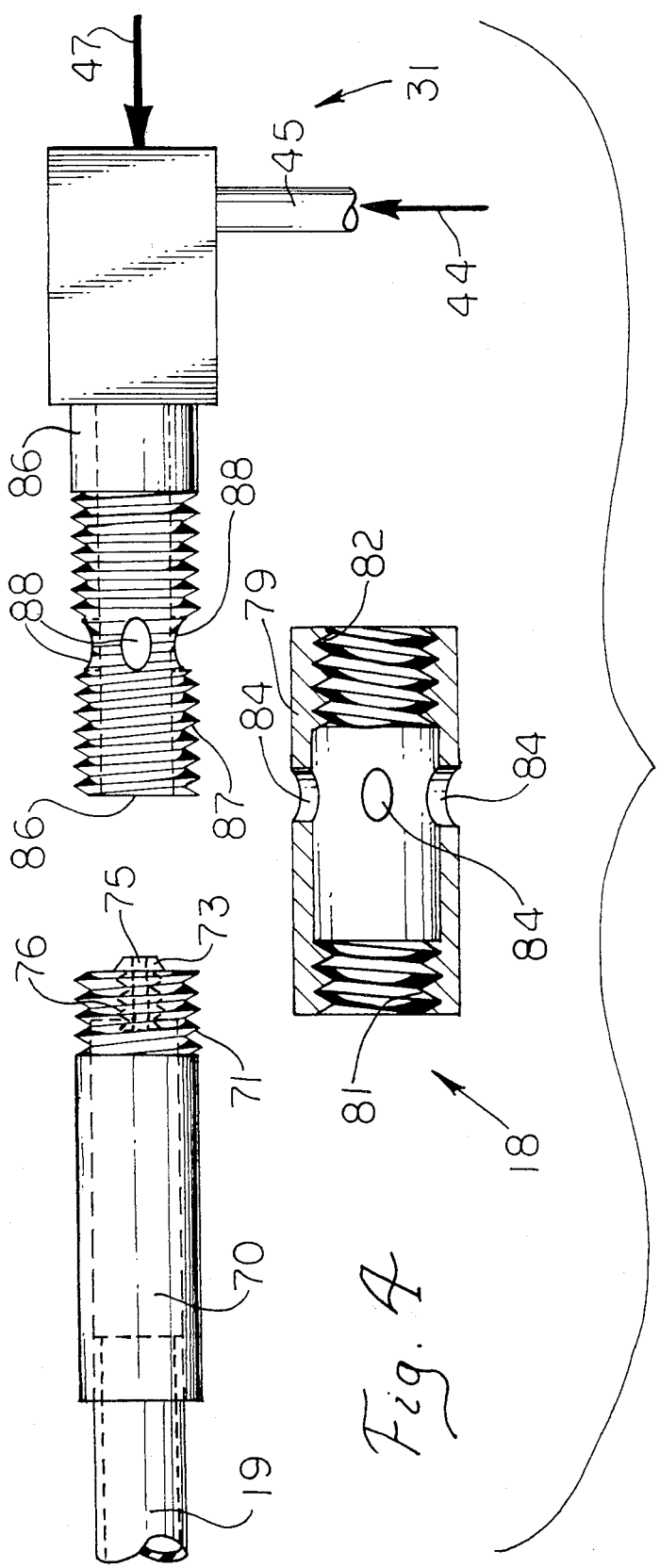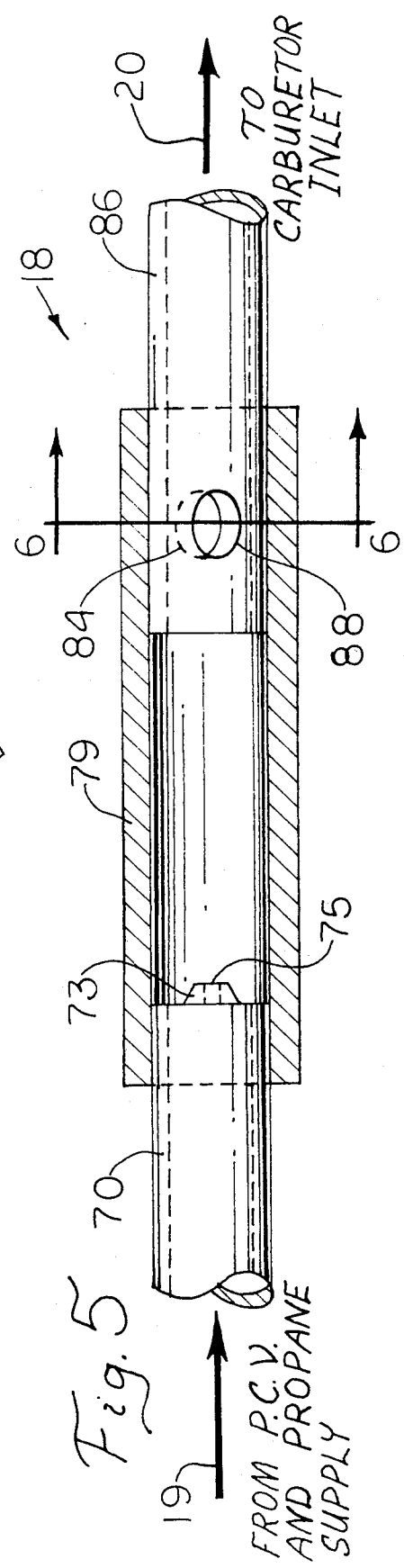
Fig. 4
Fig. 5

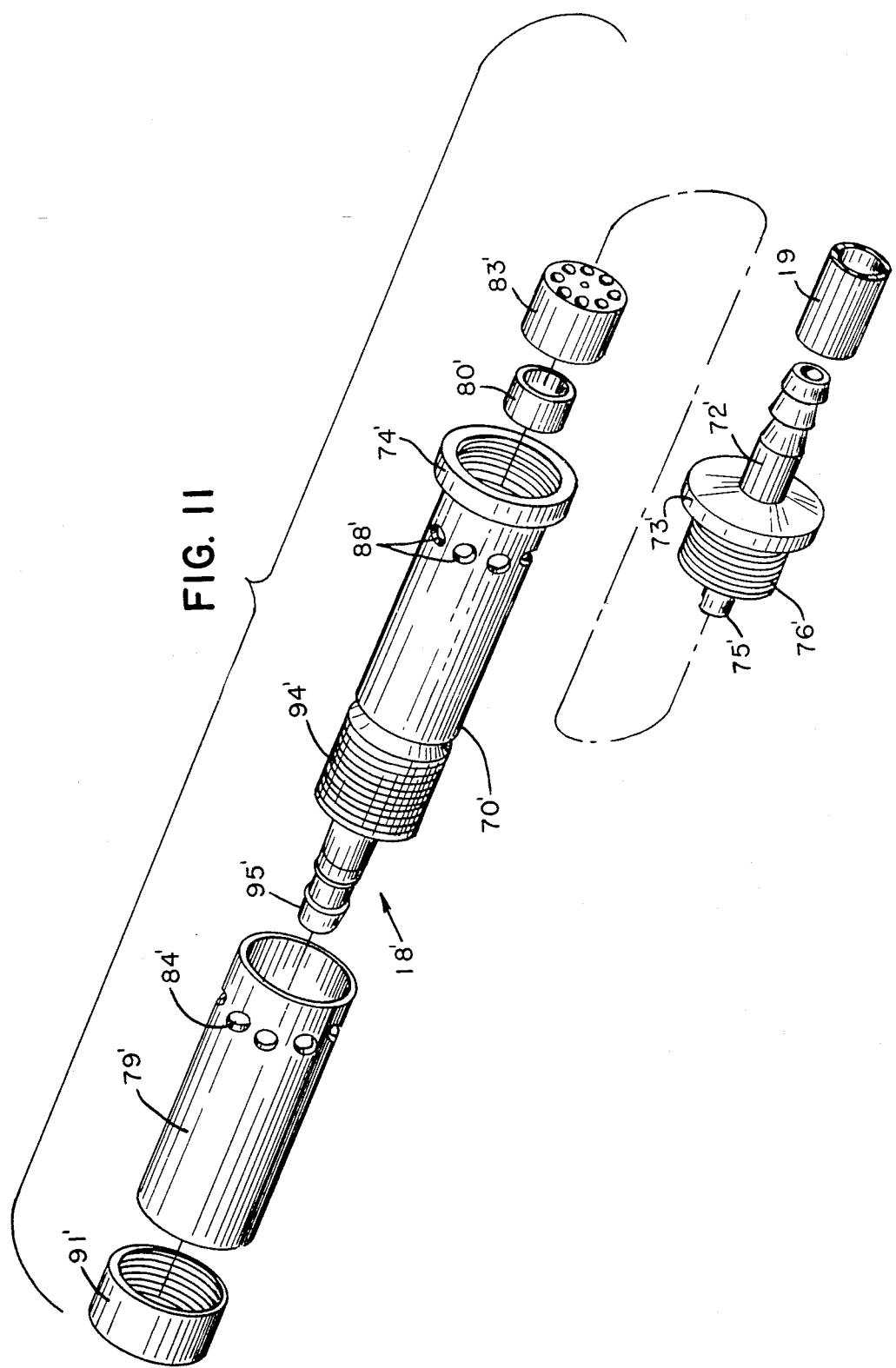

PROPANE FEEDING DEVICE FOR INTERNAL COMBUSTION ENGINES

CROSS REFERENCE TO RELATED APPLICATION

This application is a continuation-in-part application of application Ser. No. 06/424,922 filed Sept. 27, 1982, now abandoned, invented by Lavrne F. Masson, entitled PROPANE-ENRICHED GASOLINE SUPPLY FOR INTERNAL COMBUSTION ENGINES, the disclosure of which is incorporated herein by reference.

BACKGROUND OF THE INVENTION

This invention relates to devices for introducing propane into standard, gasoline powered internal combustion engines, and in particular, to engines which permit the simultaneous introduction of gasoline and propane.

Because there have been recurring shortages of gasoline in recent years, there have been a number of attempts to develop efficient systems for converting gasoline burning engines to accept propane as a fuel. Generally, the converted vehicles have been designed to burn gasoline or propane alternately. Furthermore, the fuel distribution systems for the propane have been extremely complicated. Therefore, they have been quite expensive to install, and they have not gained widespread acceptance.

Such systems typically do not simultaneously inject propane and gasoline into the engine. Simultaneous injection increases the octane of the combined fuel as compared with gasoline, making the engine run more smoothly and efficiently. Furthermore, no such system for simultaneous injection of propane and gasoline into an automobile engine has been designed to be added onto an engine at a very low cost and with few modifications to the engine such that a person with little mechanical ability could install such a system himself.

SUMMARY OF THE INVENTION

In one aspect, the present invention is adapted for use in combination with an internal combustion engine having a gas vaporizing carburetor, a standard fuel system for supplying gasoline to the engine and a vacuum source means to create a vacuum. A propane supply reservoir is provided including a conduit which connects the supply reservoir to the carburetor. A propane throttling and metering valve is positioned in the conduit. The valve has vacuum responsive means associated therewith to actuate the valve and change the flow of propane therethrough in direct relationship with the change of vacuum pressure of the vacuum source. The vacuum responsive means is operably connected to the vacuum source means, the suction of the vacuum increasing with increasing engine speed. Accordingly, propane can simultaneously be injected into the carburetor in increasing amounts with increased engine speed.

Another aspect of the invention is the provision of a kit for converting a gasoline burning, internal combustion engine to simultaneous burning of gasoline from a gasoline reservoir and propane from a propane reservoir. The kit includes a propane throttling and metering valve for metering propane from the propane reservoir and an aspirating, aerating unit connectable between the valve and an engine carburetor for metering, aerating and providing aerated propane to the carburetor. The aspirating aerating unit located in the conduit between the valve and the carburetor increases engine performance. Thus, the air-fuel ratio of the fuel mixture will be maintained at a proper proportion when the aspirating aerating unit premixes air with the propane before the propane-air mixture is introduced into the carburetor.

The propane injection or enrichment system of the present invention can easily and inexpensively be added to a standard internal combustion engine. Indeed, with its addition, the gasoline consumption of the engine is improved and performance of the engine is enhanced. The propane supply reservoir can be placed in the trunk of the automobile or in another inconspicuous location. A first conduit is connected between the supply reservoir and the carburetor, preferably where the positive crankcase ventilation (PCV) valve connects to the carburetor. The propane metering and throttling valve is positioned in the first conduit. The vacuum responsive means associated with the throttling valve can then be connected by a third conduit to a vacuum source, say, the vacuum created by the exhaust gas recirculation (EGR) valve. If desired, the aspirating aerating unit can also be located in the first conduit between the throttling valve and the carburetor. Therefore, the entire system can be installed simply by adding a propane reservoir, three conduits and two other components which are mechanically quite simple. The system is designed to be installed by the "backyard" mechanic with little training in automotive mechanics.

In addition, the present invention is inexpensive to manufacture, especially in comparison with the costs of converting a typical gasoline engine to totally consume propane or a like lower aliphatic hydrocarbon fuel supply. The system does not require any significant change in either the internal combustion engine itself to which it is applied or the vehicle driven by such engine. Moreover, the system is safe and nonhazardous since the propane supply may be incorporated in a protected area of a vehicle as noted above. The system does not render the internal combustion engine inoperable if the supply of propane or other similar gaseous fuel is exhausted during operation. Since the system is designed to supplement the main or principal gasoline fuel supply to the engine, the engine can operate properly without the supplemental propane source. In addition, use of the present supplemental propane system with an internal combustion engine does not disable or require any modification to normal crankcase, exhaust gas or other vapor handling and distribution patterns for the engine.

These and other objects, advantages and features of the invention will now be apparent from a study of the following description taken in conjunction with the drawings.

BRIEF DESCRIPTION OF THE DRAWINGS

FIG. 4 is an exploded view, shown partly in section, of one embodiment of the propane aspirating aerating unit of the present invention;

FIG. 5 is a broken, sectional side elevation of a second embodiment of the air aspirating unit of the present invention;

FIG. 7 is a side elevation, shown partly in section, of a third embodiment of the aerator aspirating unit of the present invention connected with a carburetor assembly of an internal combustion engine;

FIG. 11 is an exploded perspective view of a fourth embodiment of an aspirating aerating unit of the present invention;

DETAILED DESCRIPTION OF THE PREFERRED EMBODIMENTS

Figure 1:
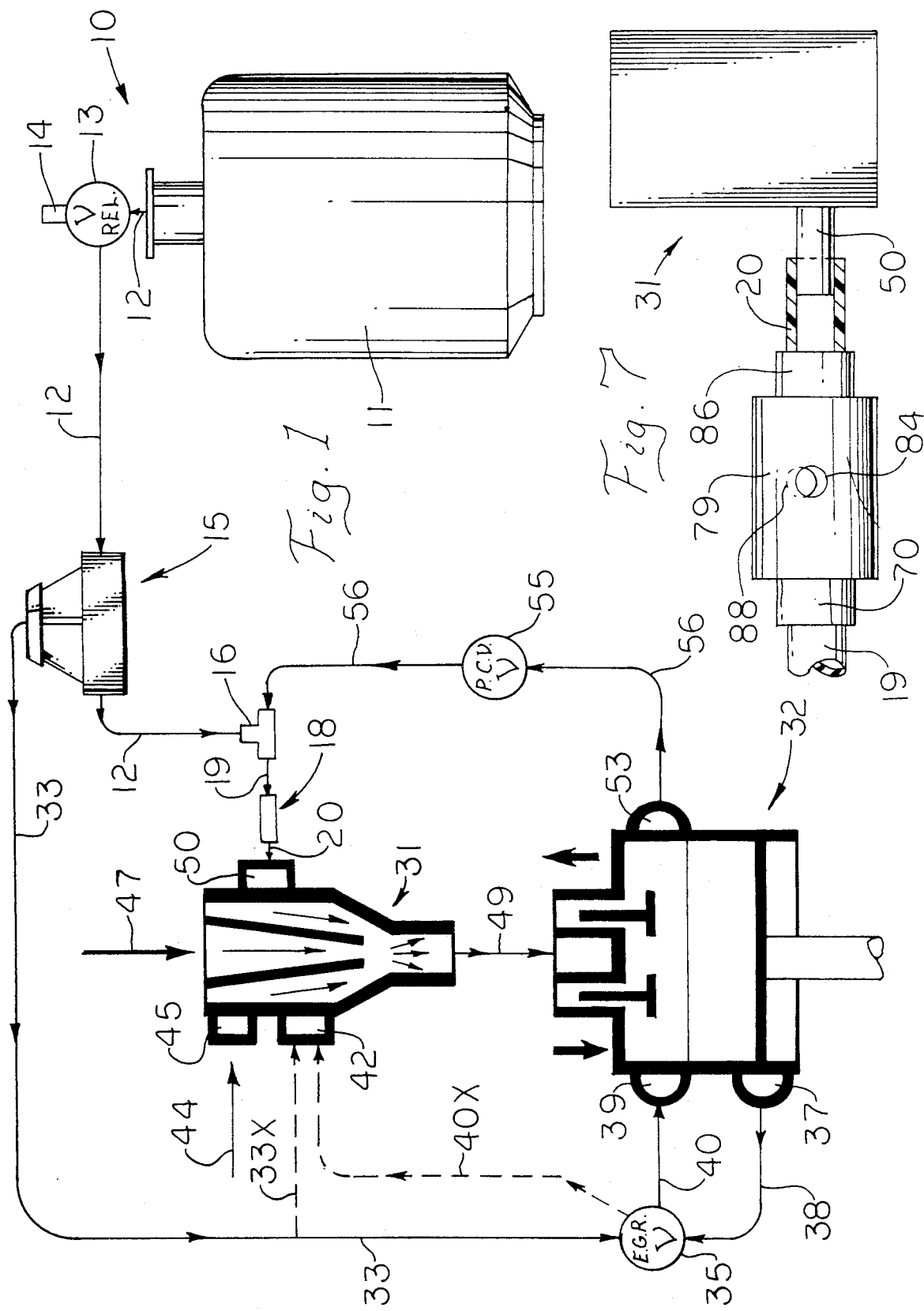
FIG. 1 is a schematic view of the system components of the present invention installed in a conventional internal combustion engine.

A modified internal combustion engine adapted to burn both propane and gasoline simultaneously is illustrated in FIG. 1 and is generally designated 10. The modified engine 10 includes a propane tank 11 which is securely mounted by straps or the like in the trunk or storage compartment of an automobile. A supply line 12 draws propane from tank 11 though a relief valve 13 which has an atmospheric vent 14 for safety reasons. Supply line 12 leads from tank 11 and eventually connects to carburetor 31 in a manner to be described. Positioned in conduit 12 is a specially adapted propane throttling and metering valve 15 responsive to a vacuum generated by the engine, and more specifically, the exhaust gas recirculation valve 35 connected to valve 15 by a vacuum line 33. Conduit 12 connects with a fume conduit 56 leading from the positive crankcase ventilation (PCV) valve 55 by a T-fitting 16. T-fitting 16 mixes the unburnt propane from valve 15 with partially burnt hydrocarbons drawn from the valve head cover 53 of the engine 32. The propane/exhaust gas mixture is then drawn through a conduit 19 connected to T-fitting 16 and the mixture is aerated by an aspirator aerating unit 18 before the aerated mixture is introduced into the carburetor through conduit or line 20 and the PCV valve inlet port 50 on carburetor 31. Carburetor 31 simultaneously draws gasoline through gasoline inlet or supply port 45 as shown by arrow 44. Thus, it will be understood that the propane-air mixture will be mixed with the gasoline in carburetor 31 and the amount of propane injected into the engine will increase as the vacuum drawn by EGR valve 35 and engine 32 increases. The gasoline/propane/air mixture is fed from carburetor 31 to the engine cylinders as shown by arrow 49 (FIG. 1). In addition, it can be seen that the modification to the vehicle is quite simple involving only the addition of a propane tank 11, a throttling valve 15, a feed conduit 12, a T-fitting 16, an aerator 18 and a vacuum line 33. With the exception of valve 15 and aspirator 18, all of the components added are conventional. All of the components can easily be obtained or made at low cost.

It should be understood that the term "propane", as used herein, includes hydrocarbons which normally exist on a gaseous state at standard temperature and pressure. Such hydrocarbons contain typically from one to five carbons per molecule, and can be branched or unbranched, saturated or unsaturated.

Figure 2:
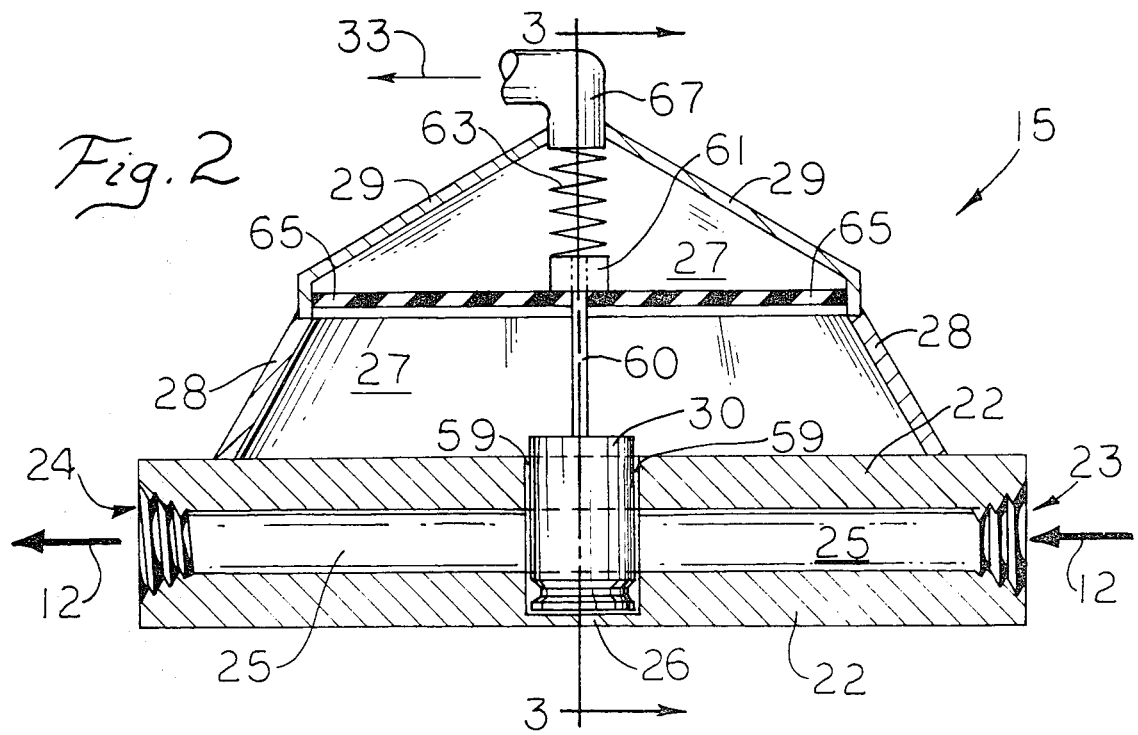
FIG. 2 is a sectional, side elevation of the metering and throttling valve of the present invention.
Figure 3:
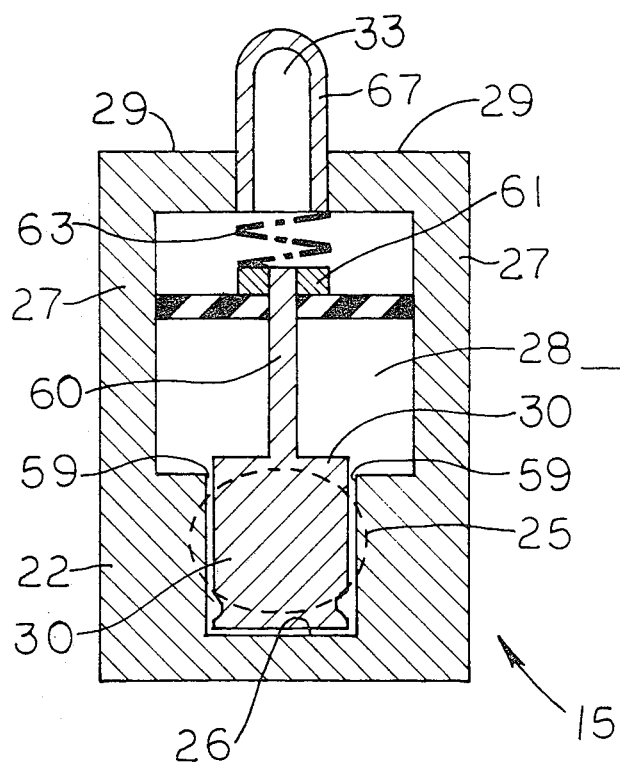
FIG. 3 is a sectional end elevation taken along the plane of line III—III of FIG. 2.

One embodiment of the metering and throttling valve 15 of the present invention is shown in greater detail in FIGS. 2 and 3. Valve 15 has a base 22 through which a passageway 25 extends. The threaded inlet 23 of passageway 25 is connected to conduit 12 leading from tank 11. The threaded outlet 24 of passage 25 is connected to line 12 leading to T-fitting 16. A cylindrical bore 59 intersects and passes laterally across passage 25 forming a valve seat 26 which is tapped in the base of valve 15. Bore 59 and seat 26 receive a cylindrical plug or gate member 30 which is movable in bore 59 into and out of conduit 25 to throttle or regulate the flow of propane through passageway 25.

Disposed above base 22 is an upwardly tapering housing formed by sidewalls 27, end walls 28, and a cover 29. A resilient, flexible diaphragm element 65 extends laterally across and within the said housing to form an upper chamber 27a and a lower chamber 27b within the housing. A stem 60 extends downwardly from diaphragm 65 and is fixedly secured to gate member 30 such that, as diaphragm element 65 is stretched and arched upwardly under the suction applied through vacuum port 67 in vacuum line 33, gate member 30 will be moved outwardly from passageway 25 permitting propane to flow therethrough. Similarly, when the suction is relieved and diaphragm 65 returns to its flat, unflexed position, gate member 30 will move across and block passage 25 preventing propane from flowing therethrough. Stem 60 is connected to diaphragm 65 by a cap 61 fitted about the upper portion of stem 60. A spring 63 extends between cap 61 and cover 29 to bias gate member 30 to its closed position wherein diaphragm 65 is flat and unflexed.

Vacuum line 33, which connects port 67 and EGR valve 35, establishes fluid communication between upper housing 27a and EGR valve 35. Therefore, as the vacuum drawn by the exhaust gas recirculation valve 35 through conduit 33 increases, the center of diaphragm 65 will be urged upwardly a greater distance against the bias of spring 63 thereby raising gate element 30 higher and higher such that propane can flow through passageway 25. The degree of restriction provided by gate element 30 across passageway 25 will, of course, vary with the strength of the vacuum drawn through line 33 by EGR valve 35. Since the strength of the vacuum increases with increasing engine speed, the amount of propane permitted to flow through passageway 25 into the carburetor 31 will increase with increasing engine speed.

As will also be understood, the strength of spring 63 is selected to adequately resist upward, valve opening movement of gate member 30 until sufficient vacuum forces are created by the engine 32 running faster than its idling speed. Thus, preferably, the valve will not permit propane flow until the engine runs faster than its idle speed of 1000 RPM or below. This prevents supplementation of the normal gasoline flow through the carburetor with the propane/air mixture from the present invention during periods of low engine or idle speed. At such times, the motor is generally not under great load and enhanced fuel efficiency is not of great value. Thus, valve 15 is designated to operate only at times when the engine speed is sufficiently high to require enhanced fuel efficiency. Valve 15 is also designed such that the quantity of propane fed therethrough is proportional to the gasoline consumption per unit period of time thereby further maximizing fuel efficiency.

As mentioned above, the propane regulated by valve 15 flows through conduit 12 into T-fitting 16 where it is mixed with crankcase fumes withdrawn from the engine valve head cover 53 and regulated by PCV valve 55 through a line 56. Line 56 connects to one arm of the T-fitting 16. The second arm of the T-fitting is connected to line 12. The third arm of the T-fitting is connected to line 19 which, in turn, is connected to aspirating unit 18. Accordingly, it can be seen that the recirculated crankcase vapors are mixed with the propane in T-fitting 16, which has the effect of warming the propane and enhancing its combustibility. Of course, combustion of such crankcase vapors also reduces undesired exhaust emissions.

The crankcase vapor/propane mixture from T-fitting 16 is then aerated with the aerating unit 18 One embodiment of the aspirating unit 18 is shown in greater detail in FIG. 4. Aerator 18 includes an inlet barrel 70 which is connected at one end to line 19. The other end of inlet barrel 70 is threaded at 71 and has a nozzle 75 which communicates and is coaxial with the passageway extending through barrel 70.

The threaded end 71 of barrel 70 threadably connects with the threaded inlet 81 of an apertured cylindrical sleeve 79. Sleeve 79 has a plurality of apertures 84 equally spaced and positioned around the circumference of the sleeve 79. Thus, as propane is ejected through the orifice of nozzle 75, the high velocity gas passing through sleeve 79 will aspirate and draw air into the sleeve through openings 84.

The other end of sleeve 79 is threaded at 82 and connects with an outlet tube 86 which is threaded externally to receive threaded sleeve end 82. Outlet tube 86 also has a plurality of equally spaced, circumferential apertures 88. Apertures 88 are positioned so that they may be aligned with apertures 84 in sleeve 79. By threadably rotating sleeve 79 on outlet tube 86, apertures 88 can be completely aligned with apertures 84 to permit the maximum amount of air to be aspirated into aspirator 18. Alternatively, apertures 84 can be only partially aligned with apertures 88 to reduce the amount of air aspirated into aspirator 18. Also, apertures 84 can be positioned completely out of alignment with apertures 88 to prevent any air from being drawn into aspirator 18. It has been found, however, that allowing at least some air to be drawn into aspirator 18 increases the mileage obtained with the system.

Outlet tube 86 is connected directly to carburetor 31. Preferably, outlet tube connects to the PCV valve port on the side of carburetor 31. As shown in FIG. 4, carburetor 31 draws gasoline through gasoline inlet fuel supply port 45 and air through an air infeed 47 as is conventional with such carburetors. Accordingly, the gasoline, air and air/propane/recirculated crankcase vapor mixture will be mixed in carburetor 31 and drawn into the engine 32 together.

EGR valve 35 generates the vacuum for line 33 and valve 15 and is connected at its inlet end by a line 38 to the exhaust manifold 37 of engine 32. The outlet end of EGR valve 35 is connected by a line 40 to intake manifold 39. Optionally, the outlet end of EGR valve 35 may be connected to an EGR vacuum port 42 on carburetor 31 by a line 40x.

If line 40x is used, the vacuum generated by EGR valve 35 is drawn through line 33x connected to EGR vacuum port 42 on carburetor 31. Since the exhaust gas recirculated through valve 35 increases with engine speed, it will be understood that the vacuum drawn through line 33 will increase in intensity as engine speed increases. Therefore, as indicated above, gate element 30 will be moved further outwardly from passageway 25 in valve 15 as engine speed increases, allowing more propane to flow through passageway 25 and into carburetor 31.

Figure 8:
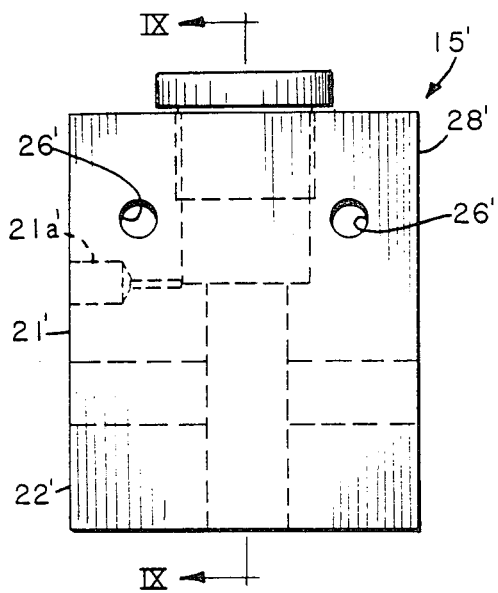
FIG. 8 is a front elevation of a second embodiment of a metering and throttling valve of the present invention.
Figure 10:
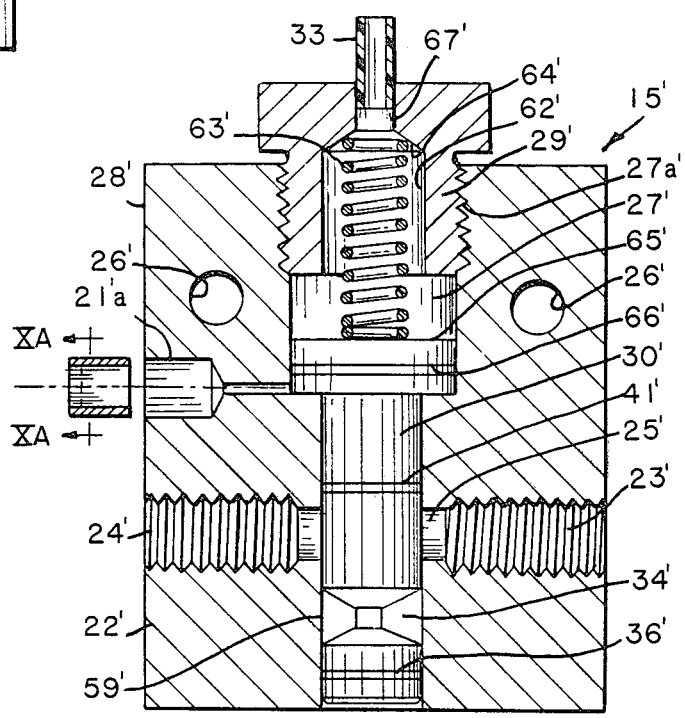
FIG. 10 is a sectional front elevation taken along the plane of line X—X of FIG. 9.
Figure 9:
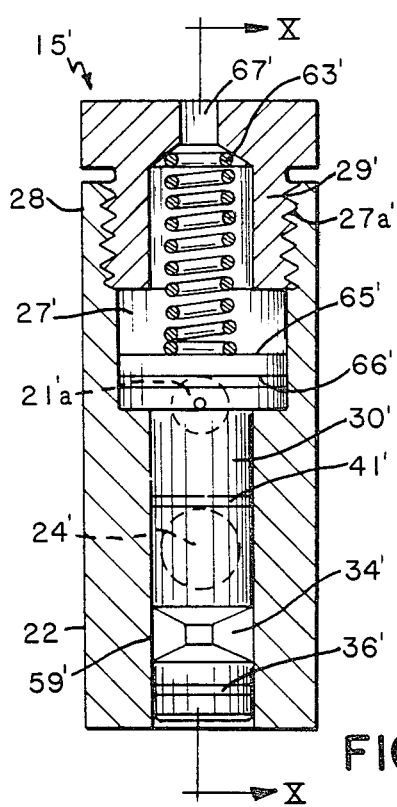
FIG. 9 is a sectional and elevation of the metering and throttling valve taken along the plane of line IX—IX of FIG. 8.

An alternative embodiment of the throttling valve of the present invention is illustrated in FIGS. 8 through 10 and is generally designated as 15'. Valve 15', which is preferably formed from aluminum, has a block 21' including a base portion 22' with a passageway 25' extending through base 22'. Mounting holes 26' are provided through block 21' for convenient attachment of the valve to a support on or near the engine. An inlet 23' connects to propane tank 11 by line 12 and an outlet 24' connects to T-fitting 16 by line 12. A cylindrical passageway 59' passes through block 21' laterally across and intersecting with passageway 25'. Passageway 59' communicates with a cylindrical bore 27' in an upper portion 28' of block 21'. A piston 65' is positioned slidably within cylinder 27' and an O-ring 66' extends circumferentially around piston 65' to seal piston 65' within bore 27'. A valve element 30' extends downwardly from piston 65' into opening 59'. Valve element 30' has a reduced-diameter neck portion 34' near its lower end. An O-ring 36' extends around the lower end of element 30' to prevent gas from escaping from passageway 25' to the lower end of bore 59'. An O-ring 41' extends circumferentially around element 30' near its middle to prevent propane in passageway 25' from exerting an upward force on the bottom side of piston 65'. Bore 27' has an upper threaded portion 27a' receiving a threaded cap 29' which closes cylinder 27'. Line 33 connects to opening 67' through cap 29' so that a vacuum may be exerted on the upper surface of piston 65'. A spring 63', seated between conical depression 64' at the end of bore 62' in cap 29' and cylindrical protrusion 65a' on piston 65', is biased between the upper surface of piston 65' and the bottom of cap 29' and exerts a downward bias on piston 65'. This urges the narrowed neck portion 34' of valve element 30' to a position below passageway 25' preventing gas from flowing through that passageway.

However, when a vacuum is drawn through line 33, and thus bores 64' and 27', piston 65' is drawn upwardly against the downward bias of spring 63'. If the suction is great enough, neck portion 34' will be positioned in registry with passageway 25' allowing propane gas to flow through that passageway. Of course, the amount of propane permitted to flow through passageway 25' will depend upon how much of the neck portion 34' registers with passageway 25'. If only part of the neck portion 34' is positioned across passage 25', the flow will be somewhat reduced when compared to the flow if all of neck portion 34' is positioned directly across passageway 25'. Of course, the vacuum strength required to open the valve can be adjusted by threading cap 29' into or out of cylinder 27a to increase or decrease the tension on spring 63'. When the spring tension is decreased by threading cap 29' outwardly, the vacuum required to open the valve is reduced. Conversely, when cap 29' is threaded inwardly, the spring tension is increased, and the vacuum required to open the valve is increased.

A vent 21a' communicates with the bottom part of cylinder 27' to prevent piston 65' from binding due to gases trapped at the bottom of piston 65'. In the open position, for example, with piston 65' in its uppermost position, air will be present below piston 65' between it and the bottom of cylinder 27'. To allow piston 65' and valve element 30' to travel freely downwardly without compressing this air, vent 21a' is provided which exhausts the air in this region.

Figure 10A:
FIG. 10a is a sectional elevation taken along the plane Xa—Xa of FIG. 10.

Positioned within vent 21a' is a filter screen 21b' shown in FIGS. 10 and 10a. Filter screen 21b' effectively prevents large particulate matter from being sucked into and clogging vent 21a'. Filter screen 21b' is cylindrical in shape and is retained within the enlarged portion of vent 21a' with an interference fit.

A second alternative embodiment of the air aspirating unit of the present invention is shown in FIG. 7. An inner sleeve 70 made of polymeric material is connected to line 29 at one end and to line 20 at the other. Inner sleeve 70 has at least on circumferential opening 88 extending through its sidewall. An outer sleeve 79 is slidably, but tightly received over inner sleeve 70 and has a circumferential opening 84 which be aligned with opening 88. Accordingly, the amount of air aspirated into the aerating unit illustrated in FIG. 7 can be regulated simply by rotating sleeve 79 on sleeve 70 to align apertures 84 and 88. Once rotated, the tight fit of the sleeves maintains the position of the apertures. It can be seen that the aspirating unit shown in FIG. 7 is quite simple and can easily and inexpensively be manufactured.

Figure 6:
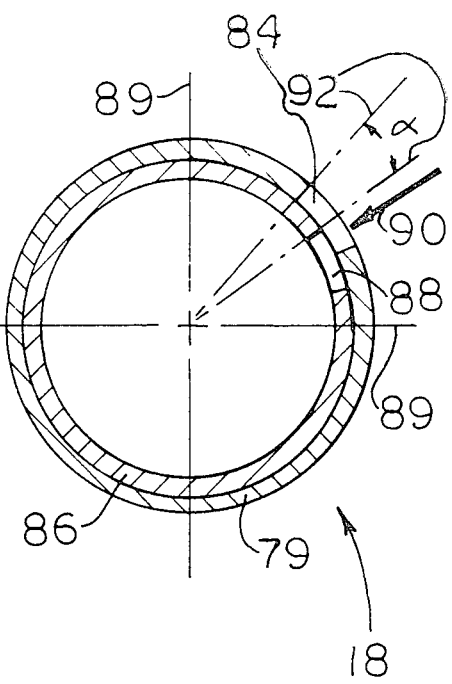
FIG. 6 is a sectional end elevation of the air aspirating unit taken along the plane of line VI—VI of FIG. 5.

A third embodiment of the aspirating unit 18 of the present invention is illustrated in FIGS. 5 and 6. The inlet tube 70 connects at one end to tube 19. The other end of tube 70 is tightly received within one end of an inner sleeve 79 and has a nozzle 73 with a jet opening 75. The other end of sleeve 79 telescopically receives an outlet tube 86 which is connected by line 20 to the carburetor. Sleeve 79 has at least one circumferential aperture 84 which is registrable with a circumferential aperture 88 through outlet tube 86. Air can be aspirated into aspirating unit 18 as shown by arrow 90 by at least partly aligning apertures 84 and 88, for instance at angle a, as shown in FIG. 6.

A further and more preferred embodiment 18' of the aspirating aerating unit of the present invention is illustrated in FIGS. 11 through 14. Aspirator 18', which is preferably made from aluminum to resist corrosion and to reduce weight, has an inner sleeve 70' with a plurality of circumferential apertures 88' near its inlet end. An outer sleeve 79' is slidably received over the inner sleeve 70'. Outer sleeve 79' also has a plurality of circumferential apertures 84'. As in the case of the two embodiments described above, air can be aspirated into the inner sleeve 70' when propane gas is flowing through the inner sleeve simply by rotating sleeve 79' on inner sleeve 70' so that apertures 84' are at least partially aligned with apertures 88'.

Figure 12:
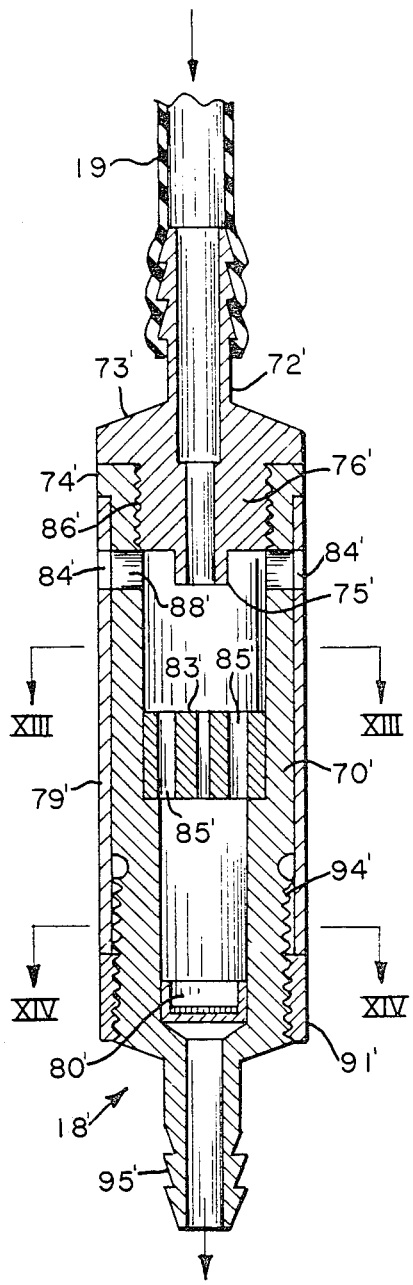
FIG. 12 is a sectional elevation of the aerating unit of FIG. 10.

The inlet of the aspirating unit is formed by an inlet cap 73' which has a tubular connector portion 72' which connects to line 19. The bore through inlet tube 72' communicates with the passage through a jet orifice 75' is located at the end of a threaded extension 76' of cap 73'. Threaded extension 76' is threadably received within the internally threaded inlet end 86' of inner sleeve 70'. When cap 73' is threadably received within the inlet end of inner sleeve 70', the outlet of jet orifice 75' is located beyond a plane intersecting the centers of openings 84 and 88 as shown in FIG. 12. Thus, the propane entering into inner sleeve 70' will be ejected downstream beyond openings 88' so that there is little possibility of propane escaping through openings 88'.

Figure 13:
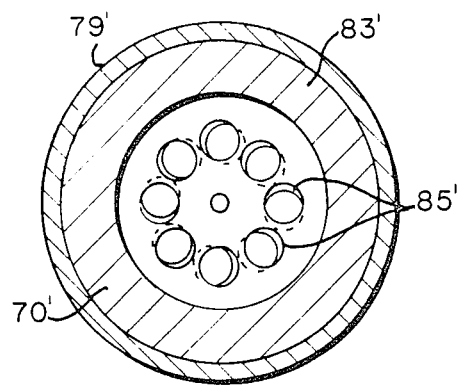
FIG. 13 is a sectional end elevation taken along the plane of line XIII—XIII of FIG. 10.
Figure 14:
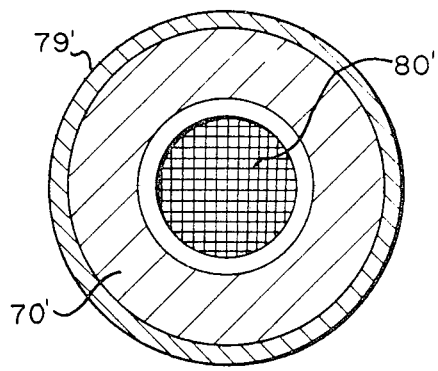
FIG. 14 is a sectional elevation taken along the plane of line XIV—XIV of FIG. 11.

Also located within inner sleeve 70' downstream of openings 88' and downstream of jet nozzle 75' is a diffuser 83'. Diffuser 83' is basically a cylindrical body or plug with an outside diameter slightly smaller than the inside diameter of inner tube 70'. Diffuser 83', as shown in FIG. 13, has a series of equally spaced apertures 85' disposed about a common centerline along the longitudinal axis of inner sleeve 70'. A central passageway 85a' extends along the centerline. Propane from jet nozzle 75' passes through passageway 85a' primarily, with some also passing through openings 85. Air drawn through holes 84', 88' also passes through openings 85'. However, openings 85' are also slanted or angled at about 10-20 degrees from the centerline axis, as shown in FIG. 13, so as to create a swirling of the propane and air mixture after the propane and air pass through the diffuser. This swirling enhances the mixing of the propane and air and the recycled crankcase vapors so as to enhance combustion of the vapors and propane.

As shown in FIG. 13, a screen 80' (FIGS. 12 and 14) is located in inner sleeve 70' downstream of diffuser 83' to filter out any gross particulate matter which might be drawn through openings 88' or be entrained in the gases injected into inner sleeve 70' by line 19.

Inner sleeve 70' also has a circumferential shoulder 74' extending radially outwardly from the inlet end of inner sleeve 70. When outer sleeve 79' is positioned over inner sleeve 70', the upstream end of sleeve 79' will abut shoulder 74'. The downstream end of sleeve 79' abuts a threaded collar 91' which is received on an exterior set of threads 94' located near the outlet end of inner sleeve 70'. Thus, outer sleeve 79' is captured between shoulder 74' and collar 91'. Furthermore, openings 84' can be locked into a given position with respect to openings 88' simply by tightening collar 91' against the downstream end of outer sleeve 79' with openings 84' in their desired position. Accordingly, unlike the embodiments of the diffuser described above, engine vibration will not inadvertently cause outer sleeve 79' to move relative to inner sleeve 70' altering the amount of air aspirated into the inner sleeve.

Aspirator 18' also has an outlet tube 95' which connects to tube 20 which conducts the mixed gases into the PCV valve inlet port 50 on carburetor 31.

It can be seen that no matter which of the embodiments above is used, an automobile can quickly be modified to burn propane and gasoline simultaneously simply by installing a readily available propane tank 11, a low pressure regulator 13, a specially manufactured valve 15 or 15' and any one of the three aspirators disclosed above. None of this equipment is very expensive compared to the much more expensive prior art systems for modifying automobiles to use propane as a fuel.

Furthermore, the present system, which permits propane and gasoline to be burned simultaneously, has a key advantage over the many prior art systems which burn the two fuels alternately. Propane has an octane rating about 110 which is considerably higher than the octane ratings of the "regular" grade of unleaded gasoline which is about 87 octane. Thus, when propane is mixed with unleaded fuel, it boosts the octane rating of the mixture which allows the engine to run much more smoothly than if it were run on unleaded gasoline alone.

A standard supply tank of propane has a capacity of about 20 pounds in weight or about 4.8 U.S. gallons. When the aerating aspirator unit and propane control valve are properly set, one can generally obtain approximately 70 miles per gallon of propane during operation of an internal combustion engine in an automobile of the larger, noncompact type. Thus, such a vehicle should travel nearly 350 or so miles before any propane refilling or replacement is needed. In the great number of cases, propane refilling or recharging approximately coincides with the need to refill gasoline during the travel of such a larger vehicle. Of course, it is always possible to use a second or additional propane tank in such a vehicle thereby reducing the frequency of needed recharging or refilling of propane.

Tests with the system including valve 15 and aspirating aerator unit 18 described above have established that mileage can actually be boosted using the combined fuels as opposed to burning gasoline alone. For instance, in a 1976 Oldsmobile "Delta 88", the fuel economy obtained before installation of the present invention was about 17 miles per gallon. After the system was installed, the mileage rose to about 21 miles per gallon. After making appropriate adjustments to the aerating unit, mileage increased again to about 25 miles per gallon for relatively stop and go driving and to about 30 miles per gallon for highway driving at normal speeds between about 55 and 75 miles per hour.

In the above tests, all of the conduit, feed and vacuum lines were of standard ⅜ inch internal diameter plastic automotive tubing. The propane aerator unit 18 had ⅜ inch ID and 3/16 inch holes 84, 88. The 1976 Oldsmobile which was equipped with the system had a 26 gallon gasoline tank for its conventional gasoline fuel supply. With the propane enrichment system of the present invention installed thereon, that automobile averaged (for all driving conditions) an approximate use of about 5 gallons of propane per each 26 gallons of gasoline. Thus, the total fuel capacity was 31 gallons and enabled driving under the best conditions of almost 800 miles on and with a fuel capacity load of both propane and gasoline.

It is noted that the propane supplement added with the present system should add at least 1% on the approximate total weight of the resulting mixed fuel (i.e., "WT.%" as regards the propane/gasoline mixture). Preferably, this figure for the amount of propane in the fuel mixture is at least 10 weight percent with a preferable range for such mixture being between about 15 and about 25 weight percent.

In another experiment, a 1975 Oldsmobile Cutlass with a 50 CID engine averaged no more than 19-20 miles per gallon before installation of the propane metering system of the present invention. After its installation, mileage increased to about 32-35 miles per gallon. The mileage improvements for both of these vehicles includes the propane used while driving.

This increase in engine performance and economy can be achieved at relatively low cost. The cost is certainly much less than the typical prior art methods of providing for propane and gasoline to be used in an alternating fashion or to systems which require the exclusive use of propane. The cost of converting exclusively to propane is virtually financially prohibitive compared to the long-term savings involved in using propane.

While several forms of the invention have been shown and described, other forms will be apparent to those skilled in the art. Therefore, it will be understood that the embodiments shown in the drawings and described about are merely for illustrative purposes and are not intended to limit the scope of the invention which is defined by the claims which follow.

The embodiments of the invention in which an exclusive property or privilege is claimed are defined as follows:

1. In combination with an internal combustion engine having a gasoline-vaporizing carburetor, a fuel system for supplying gasoline to said carburetor and vacuum source increasing engine speed, the improvement comprising:

a propane supply reservoir;

a conduit leading from said supply reservoir to said carburetor;

a propane metering and throttling valve positioned in said conduit for providing and controlling the flow of propane through said conduit from said reservoir to said carburetor at the same time gasoline is supplied to said carburetor, said valve having vacuum responsive means associated therewith to actuate said valve and change the flow of propane therethrough in direct relationship with the change of said vacuum pressure, said vacuum responsive means being operably connected to said vacuum source means;

an aspirating aerating unit located in said conduit between said valve and said carburetor for aspirating air into said conduit and mixing the air with propane; and said aspirating aerating unit comprising an inner tubular sleeve means having at least one aperture through its tubular wall and an outer tubular sleeve having a tubular sidewall and being slidably positioned over said inner sleeve means; said outer tubular sleeve having at least one aperture through its tubular sidewall; said inner sleeve means and outer sleeve being slidable relative to one another so that said apertures are alignable to allow air to be aspirated into inner tube and mixed with propane flowing therethrough;

whereby propane can simultaneously be injected into said carburetor in increasing amounts with increased engine speed.

2. The internal combustion engine as recited in claim 1 wherein said vacuum source comprises an exhaust gas recirculation valve adapted to recirculate exhaust gas from said engine to said carburetor, said recirculation valve producing said vacuum for said vacuum responsive means.

3. The internal combustion engine as recited in claim 1 wherein said inner sleeve means has disposed therein an orifice element for constricting the pathway therethrough and accelerating the flow of propane therethrough.

4. The internal combustion engine as recited in claim 3 wherein said inner sleeve means is a tube having diffuser means positioned therewithin downstream of said orifice element and said inner sleeve means sidewall aperture.

5. The internal combustion engine as recited in claim 4 wherein said diffuser means includes a body having a plurality of apertures therethrough at least some of which are oriented so as to force the gases passing therethrough to swirl about the longitudinal axis of and within said inner sleeve.

6. The internal combustion engine as recited in claim 5 which further includes a screen positioned within said inner sleeve near said other end of said inner sleeve so as to capture particulate matter entrained in the gases passing therethrough.

7. The internal combustion engine as recited in claim 1 which further includes a locking means to releasably lock said outer sleeve in a fixed position with respect to said inner sleeve.

8. The internal combustion engine as recited in claim 7 wherein said outer sleeve is rotatably movable around said inner sleeve means and said locking means includes an annular shoulder projecting outwardly from said inner sleeve means abutting one end of said outer sleeve, a threaded portion on the exterior surface of said inner sleeve means near the other end of said outer sleeve, and an internally threaded collar threadably received on said threaded portion so as to releasably retain said outer sleeve in a fixed position between said shoulder and said collar.

9. The internal combustion engine as recited in claim 1 wherein said vacuum responsive means comprises a housing having an interior cavity; a diaphragm sealingly positioned within said cavity forming a chamber on one side of said diaphragm, said vacuum means being connected to said chamber; and wherein said metering valve includes a valve element extending from the other side of said diaphragm and a body associated with said housing having a fluid passage therethrough connected at each end to said conduit and a valve seat located within said passage, said valve element being movable into and out of engagement with said valve seat and into and out of said passage under the action of said diaphragm so as to prevent or permit the flow of propane through said passage.

10. The internal combustion engine as recited in claim 1 wherein said vacuum responsive means comprises a block having a cylindrical piston bore therein, and a piston slidably received within said piston bore and operably connected to said valve for opening and closing said valve; means closing one end of said bore, and vacuum source means communicating with said closed end of said bore for moving said piston in said bore by said vacuum.

11. The internal combustion engine as recited in claim 10 wherein said closing means comprises a threaded portion of said piston bore near the closed end thereof and a threaded cap threadably received within said threaded bore portion; a spring positioned between said piston and cap to bias said piston toward a closed valve position, said vacuum acting to pull said piston against said spring to an open valve position, the force of said spring being adjustable by threadably adjusting the position of said cap within said threaded bore portion.

12. The internal combustion engine as recited in claim 11 wherein said valve comprises a valve element extending from said piston away from said closed end of said bore, a valve body having a valve bore and a fluid passage passing through said valve body transversely intersecting said valve bore, said valve element being positioned within said valve bore and being selectively movable by said piston across said fluid passage to prevent, partially restrict or freely permit the flow of propane through said fluid passage; said passage being connected at each end to said conduit.

13. The internal combustion engine as recited in claim 12 wherein said valve body and block are integrally formed with one another.

14. The engine as recited in claim 13 which further includes a positive crankcase ventilator (PCV) valve and a line leading from said PCV valve to said conduit and connected therewith downstream of said valve such that the warm crankcase vapors ventilated by said valve mix with said propane to increase its temperature before being introduced into said carburetor.

15. The internal combustion engine as recited in claim 14 wherein said vacuum source comprises an exhaust gas recirculation valve adapted to recirculate exhaust gas from said engine to said carburetor, said recirculation valve producing said vacuum for said vacuum responsive means.

16. A kit for converting a gasoline burning, internal combustion engine to simultaneous burning of gasoline from a gasoline reservoir and propane from a propane reservoir, comprising:

a propane metering and throttling valve for metering propane from said propane reservoir, said propane valve having vacuum responsive means associated therewith for actuating said valve and changing the flow of propane therewith in direct relationship with the change of vacuum pressure acting on said vacuum responsive means, said responsive means being connectable to a vacuum source in an internal combustion engine; and an aspirating aerating unit connectable between said valve and the engine carburetor for receiving propane metered by said valve, aerating said propane, and providing aerated propane to the carburetor.

17. The kit as recited in claim 16 wherein said aspirating aerating unit comprises an inner tubular sleeve means for connection within a conduit leading from said metering and throttling valve to said carburetor, said inner sleeve means having at least one aperture through its tubular wall; and an outer sleeve slidably positioned over said inner sleeve means, said outer tubular sleeve having at least one aperture through its tubular sidewall, said inner sleeve means and outer sleeve being slidable relative to one another so that said apertures are alignable to allow air to be aspirated into said inner sleeve means and mixed with propane flowing therethrough.

18. The kit as recited in claim 17 wherein said inner sleeve means of said aerating unit has disposed therein an orifice element for constricting the pathway therethrough and accelerating the flow of propane therethrough.

19. The kit as recited in claim 18 wherein said inner sleeve means is a tube having diffuser means positioned therewithin downstream of said orifice element and said inner sleeve means sidewall aperture.

20. The kit as recited in claim 19 wherein said diffuser means includes a body having a plurality of apertures therethrough at least some of which are oriented so as to force the gases passing therethrough to swirl about the longitudinal axis of and within said inner sleeve.

21. The kit as recited in claim 20 which further includes a screen positioned within said inner sleeve near said other end of said inner sleeve so as to capture particulate matter entrained in the gases passing therethrough.

22. The kit as recited in claim 17 which further includes locking means to releasably lock said outer sleeve in a fixed position with respect to said inner sleeve.

23. The kit as recited in claim 22 wherein said outer sleeve is rotatably movable around said inner sleeve means and said locking means includes an annular shoulder projecting outwardly from said inner sleeve means abutting one end of said outer sleeve, a threaded portion on the exterior surface of said inner sleeve means near the other end of said outer sleeve, and an internally threaded collar threadably received on said threaded portion so as to releasably retain said outer sleeve in a fixed position between said shoulder and said collar.

24. The kit as recited in claim 16 wherein said vacuum responsive means comprises a housing having an interior cavity; a diaphragm sealingly positioned within said cavity forming a chamber on one side of said diaphragm, said vacuum means being connected to said chamber; and wherein said metering valve includes a valve element extending from the other side of said diaphragm; and a body associated with said housing having a fluid passage therethrough connected at each end to said conduit and a valve seat located within said passage, said valve element being movable into and out of engagement with said valve seat and into and out of said passage under the action of said diaphragm so as to prevent or permit the flow of propane through said passage.

25. The kit as recited in claim 16 wherein said vacuum responsive means comprises a block having a cylindrical piston bore therein, and a piston slidably received within said piston bore and operably connected to said valve for opening and closing said valve; means closing one end of said bore; said closed end of said bore adapted for communication with a vacuum source on an engine for moving said piston in said bore by said vacuum.

26. The kit as recited in claim 25 wherein said closing means comprises a threaded portion of said piston bore near the closed end thereof and a threaded cap threadably received within said threaded bore portion; a spring positioned between said piston and cap to bias said piston toward a closed valve position, said vacuum acting to pull said piston against said spring to an open valve position, the force of said spring being adjustable by threadably adjusting the position of said cap within said threaded bore portion.

27. The kit as recited in claim 26 wherein said valve comprises a valve element extending from said piston away from said closed end of said bore, a valve body having a valve bore and a fluid passage passing through said valve body transversely intersecting said valve bore, said valve element being positioned within said valve bore and being selectively movable by said piston across said fluid passage to prevent, partially restrict or freely permit the flow of propane through said fluid passage; said passage being adapted for connection at each end to a conduit leading from a propane supply reservoir to a carburetor on the engine.

28. The kit as recited in claim 27 wherein said valve body and block are integrally formed with one another.

* * * * *